United States Patent
Shoji

[19]

[11] Patent Number: 6,134,763
[45] Date of Patent: Oct. 24, 2000

[54] COMBINED MACHINING APPARATUS FOR MAKING PISTON RINGS

[75] Inventor: Masahiro Shoji, Ishikawa, Japan

[73] Assignee: Komatsu Machinery Corporation, Komatsu, Japan

[21] Appl. No.: 09/148,044

[22] Filed: Sep. 3, 1998

[30] Foreign Application Priority Data

Sep. 11, 1997 [JP] Japan ................................ 9-246326

[51] Int. Cl.⁷ ................................................ B23B 7/00
[52] U.S. Cl. .................... 29/27 R; 29/27 C; 29/33 R; 29/888.07
[58] Field of Search ................ 29/27 C, 27 R, 29/33 R, 888.07, 888.076

[56] References Cited

U.S. PATENT DOCUMENTS

| | | | |
|---|---|---|---|
| 1,223,929 | 4/1917 | Blettner | 29/888.076 |
| 2,377,960 | 6/1945 | Phillips | 29/888.07 |
| 3,630,631 | 12/1971 | Becker | 408/19 |
| 3,698,054 | 10/1972 | Prasse | 29/156 |
| 3,756,099 | 9/1973 | Sullivan | 82/2.7 |
| 3,971,165 | 7/1976 | Packard et al. | 51/131 |
| 3,973,098 | 8/1976 | Harris | 219/153 |
| 4,463,487 | 8/1984 | Raggi | 29/156.63 |
| 4,679,472 | 7/1987 | Feller et al. | 82/19 |
| 4,730,373 | 3/1988 | Senoh | 29/26 A |
| 4,739,684 | 4/1988 | Brown et al. | 82/1 C |
| 4,856,105 | 8/1989 | Brocksieper et al. | 364/474.02 |
| 4,862,777 | 9/1989 | Sakurai et al. | 82/122 |
| 4,867,020 | 9/1989 | Compton et al. | 82/1.11 |
| 5,285,840 | 2/1994 | Hayashi et al. | 164/132 |
| 5,461,776 | 10/1995 | Wood | 29/888.072 |
| 5,809,643 | 9/1998 | Swick | 29/888.07 |
| 5,852,859 | 12/1998 | Swick | 29/34 R |
| 5,885,199 | 3/1999 | Shao | 483/19 |

FOREIGN PATENT DOCUMENTS

| | | | |
|---|---|---|---|
| 54-21691 | 2/1979 | Japan . | |
| 63-174824 | 7/1988 | Japan | B23P 15/06 |
| 6-75814 | 9/1994 | Japan . | |
| 11010449 | 1/1999 | Japan | B23P 15/06 |

*Primary Examiner*—David P. Bryant
*Assistant Examiner*—Essama Omgba
*Attorney, Agent, or Firm*—Frishauf, Holtz, Goodman, Langer & Chick, P.C.

[57] ABSTRACT

A combined machine tool for specific use in making a piston ring or the like from a workpiece is disclosed, in which on a common bed there are mounted: an outer and inner peripheral surface machining unit numerically controlled and having an outer peripheral surface machining section and an inner peripheral surface machining section which are operable together to simultaneously machine an outer peripheral surface and an inner peripheral surface of the workpiece, and a cut-split machining unit adapted to act on the workpiece machined over the outer and inner peripheral surfaces by the outer and inner peripheral surface machining unit, in a manner such as to machine, by cut-splitting, the so machined workpiece while it remains unaltered in position.

5 Claims, 12 Drawing Sheets

COMBINED MACHINING APPARATUS FOR MAKING PISTON RINGS

TECHNICAL FIELD

The present invention relates generally to a machine tool and in particular to a combined machining apparatus for specific use in making or preparing a piston ring or a like product, that permits a product blank or workpiece to be machined over its inner and outer peripheral surfaces and to be cut-split while it remains unaltered in position or held at substantially an identical position in different machining process stages to result in a finished product.

BACKGROUND ART

A piston ring such as incorporated in an engine has typically been manufactured from a blank or a workpiece that consists of a "piston ring aggregate" formed of a plurality of non-circular rings stacked. The workpiece is machined over its inner and outer peripheral surfaces to provide inner and outer contours with a predetermined geometrical requirement. The aggregate so machined is then cut-split or -sectioned at two pistons in a direction of its longitudinal axis. Then, the two opposed surfaces of cut of the ring may be brought and fitted together, reducing the diameter of the rings, to provide a piston ring of the machined outer periphery with a required roundness and geometry.

A machine tool or apparatus dedicated to machine the inner and outer peripheral surfaces of a workpiece in the form of an aggregate of stacked non-circular rings has been known as proposed, e.g., in Japanese Unexamined Patent Publication No. Sho 54-21691 and Japanese Examined Patent Publication No. Hei 6-75814.

Japanese Unexamined Patent Publication No. Sho 54-21691 describes a machining apparatus characterized in that it comprises a work spindle on which a piston ring aggregate may be mounted, a tool support means capable of being displaced in a radius direction of the piston ring by an amount as a function of the curvature of a non-circular curved surface of the piston ring, and at least two computer controlled electro-mechanical stepping drive means for displacing the tool support means in a radius direction of the piston ring, arranged one behind another in the direction of their operation. The apparatus is described as being capable of simultaneously machining with due precision the inner and outer peripheral surfaces of a workpiece with non-circular curved surfaces composed of free running curves, by virtue of a stepping drive means that operates under computer control while the workpiece (made up of the piston ring aggregate) on the work spindle is in rotation.

Japanese Examined Patent Publication No. Hei 6-75814 describes a numerically controlled lathe in which a tool for cutting a workpiece is mounted on a carriage that is movable by a linear motor towards and away from the workpiece. With the linear motor operated under a computer assisted NC, the apparatus is designed to machine a skirt periphery on a workpiece such as for a piston ring. In this machine, a plurality of sets of rotary members and a biasing device are provided in a guide section that supports a reciprocation of the carriage, for the purpose of receiving a reaction force generated on the cutting tool while the workpiece is being cut. These means are described to permit the carriage to be reciprocated without jolting or deflecting in any way whatever and thus to permit the workpiece to be cut with precision.

The machining apparatus described in Japanese Unexamined Patent Publication 54-21691 noted above is seen to enable both the inner and outer peripheral surfaces of a workpiece to be machined simultaneously. It requires, however, that the so machined workpiece (piston ring aggregate) on removal to another site be then cut-split with a separate cut-split machining apparatus that is separately installed.

It is thus required that the workpiece that has been machined over its inner and outer peripheral surfaces be removed from the inner and outer peripheral surfaces of a machining unit having acted thereon and transferred to a system to the cut-split machining and then be there again indexed or located as to its phase as well as its three dimensional position. Such removal, transfer and repetitive indexing requirements involve time-consuming operations which have made the conventional system low in productivity and inconvenient.

Furthermore, not only does the need for the two separate apparatuses in a system demand a large space for installation of the entire system, but also these removal, transfer and repetitive indexing requirements entail the problem of mis-centering the workpiece to be cut-split which inconveniently has most often hindered the traditional system to yield a product piston ring of due precision that is acceptable for utilization.

On the other hand, a machining apparatus of the type described in Japanese Examined Publication No. Hei 6-75814 noted above is seen to be a numerically controlled lathe functionally limited to machining the outer peripheral surface of a workpiece and unable to work both the inner and peripheral surface simultaneously. Thus, not only does it give rise to a system which necessitates further a separate apparatus for working the inner peripheral surface to be worse in productivity, but such a system which requires the inner and outer surfaces of a workpiece to be machined separately makes the workpiece susceptible of being unequally aligned and centered in the two different apparatuses and hence is inconvenient as presenting a further machining inaccuracy problem.

The workpiece in such a system, having been so machined over both its inner and outer peripheral surfaces separately, must here again be transferred to and worked in a separate cut-split machine. Thus, the system here too is encountered with the same difficulties as mentioned above in connection with the system of Japanese Unexamined Patent Publication No. Sho 54-21691 and must be deemed to be more inconvenient as involving an increased space for installation and an increased cost and expenditure for equipment.

It is accordingly an object of the present invention to resolve the foregoing problems met in the prior art and to provide a machining apparatus, combined or of a composite type, for use in preparing a piston ring or the like product, in which a workpiece can be both machined over its inner and outer peripheral surfaces and subsequently cut-split, on the same single machining apparatus while it remains unaltered in position, i.e., held at an identical position therein.

SUMMARY OF THE INVENTION

In order to achieve the object mentioned above there is provided, in accordance with the present invention, a combined machining apparatus adapted for use in preparing a piston ring or the like from a workpiece, comprising:

a peripheral machining unit mounted on a bed, being numerically controlled and including an outer peripheral surface machining section and an inner peripheral surface machining section, said sections being operable together to simultaneously machine an outer peripheral surface and an inner peripheral surface of the workpiece; and a cut-split machining unit mounted on said bed and adapted to act on the workpiece machined over its outer and inner peripheral surfaces by said peripheral machining unit, in a manner such as to machine, by cutting-splitting, the so machined workpiece while it remains unaltered in position.

It can be seen that the construction described above ensures that a workpiece is held unaltered in position for both a peripheral (inner and outer) surface machining process stage and a cut-split machining process stage and is thus freed from a deviation of its center that might occur when it is transferred from the first machining process stage to the second machining process stage. Thus, not only is due eventual machining precision thereby assured to be obtained, but in the system a need for such a transfer becomes no longer necessary and a considerable saving for the expenditures of time and means otherwise entailed for workpiece transfer operations is thereby attained.

Also, a need for the separate installation of inner and outer peripheral surface processing apparatus and cut-split processing apparatus is hereby eliminated. This permits the two distinct machining processes to be carried out in continuation and makes facilities and labor for storing half-finished products or workpieces (completed only with respect to peripheral (inner and/or outer) surfaces) unnecessary.

In the construction defined above, it is preferred that the said cut-split machining unit include a single rotary cutter adapted to cut-split more than one time the workpiece (at more than one site of it in succession) while it remains unaltered in position.

This specific construction eliminates the need for a a hard, complicated, troublesome and skillful handling of manually adjusting the cutter position with respect to the multiple axes, and thus largely reduces the time of machining setups and preparations, and makes a trial cutting unnecessary, so that an enhanced working efficiency ensues.

In the construction described above, it is also preferred that said peripheral machining unit comprises:

a workpiece support means for vertically clamping the workpiece as rotatable about a longitudinal axis thereof oriented substantially vertically, a C-axis drive means adapted to be numerically controlled for rotating the workpiece about its longitudinal axis representing a C-axis with an intermediary of said workpiece support means, said outer peripheral surface machining section arranged as movable in a direction of X-axis extending orthogonal to the longitudinal axis of the workpiece and operable with a first cutting tool means adapted to be numerically controlled to operate in synchronism with the said C-axis drive means operating for machining the outer peripheral surface of the workpiece with the said first cutting tool means, said inner peripheral surface machining section arranged as movable in a direction of U-axis extending parallel to said X-axis and operable with a second cutting tool means adapted to be inserted from an end side of the workpiece and adapted to be numerically controlled to operate in synchronism with said C-axis drive means operating for machining the inner peripheral surface of the workpiece with said second cutting tool means, and a Z-axis drive means adapted to be numerically controlled for moving the workpiece in a direction of said longitudinal axis.

This specific construction allows a cutting dust produced while the inner peripheral surface is being cut to run down and prevents it from stagnating in the cutting area. Any deterioration of cutting precision as caused by such a dust is thus avoided. Furthermore, separate provision for dust exhausting is not required, so that the entire make-up of the apparatus is simplified.

Also, said support means that is arranged to vertically clamp a workpiece (product blank) in the form of an aggregate of blank elements vertically stacked is more advantageous than if arranged to clamp it in a lateral direction, in terms of making smaller in body size a machining apparatus as described that inherently needs to support means for applying pressure. This provision also simplifies the make-up of the apparatus and reduces the cost for it.

It is also preferred that said cut-split machining unit comprises:

a workpiece support means common to that for said peripheral machining unit for vertically clamping the workpiece as rotatable about its longitudinal axis, a C-axis drive means common to that of said peripheral machining unit for rotating the workpiece about its longitudinal axis representing a C-axis with an intermediary of said workpiece support means, thereby indexing or determining a cut-split position for the workpiece, a Z-axis drive means common to that of said peripheral machining unit and adapted to be numerically controlled for moving workpiece in a direction of the said longitudinal axis, a V-axis drive means operable with a cutter for cut-splitting the workpiece, having a V-axis motor and adapted to be numerically controlled for moving said cutter in engagement with and away from the workpiece in a direction of V-axis, and a W-axis drive means having a W-axis slide for supporting said V-axis drive means, including a W-axis motor and adapted to be numerically controlled for moving the workpiece in a direction of W-axis extending orthogonal to the longitudinal axis of said workpiece, thereby correcting a deviation of said cutter from the cut-split position for the workpiece arising from a deviation said C-axis.

This specific construction, permitting a single workpiece support means, a single C-axis drive means and a single X-axis drive means as well as a single NC to be provided commonly for both the machining units, reduces the cost for the apparatus to a greater extent than if they are provided for each of the machining units and, eliminating the need for separate provision of means for indexing or determining a cut-split position, allows the cut-split machining unit itself also to be made up less costly.

It is also preferred that a workpiece transfer means be disposed in front of said peripheral surface machining unit and said cut-split machining unit.

This specific construction affords the apparatus the ability to fully automate all required or possible workpiece transfer operations, including an introduction into the system, a transfer between the two machining units and a carrying out of each of them, of a machined workpiece, thus making the apparatus operable in an unmanned state with a large reduction of the labor cost.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings

BEST MODES FOR CARRYING OUT THE INVENTION

Hereinafter, suitable embodiments of the present invention with respect to a combined machining apparatus set forth with reference to the accompanying drawings hereof.

Figure 1:
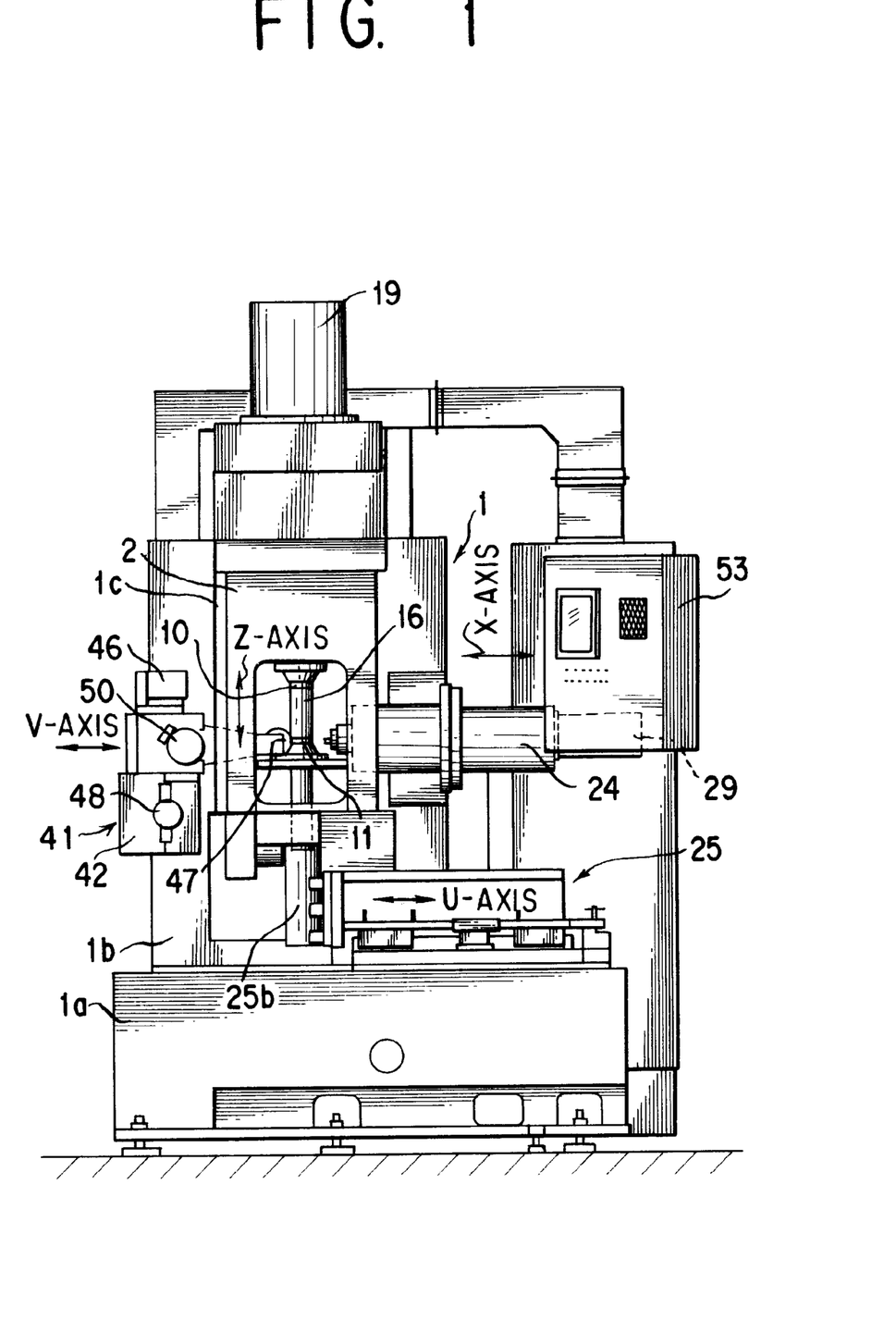
FIG. 1 is a front view that illustrates a combined machining apparatus for use in preparing a piston ring or the like product, embodied in a certain preferred form in accordance with the present invention.
Figure 2:
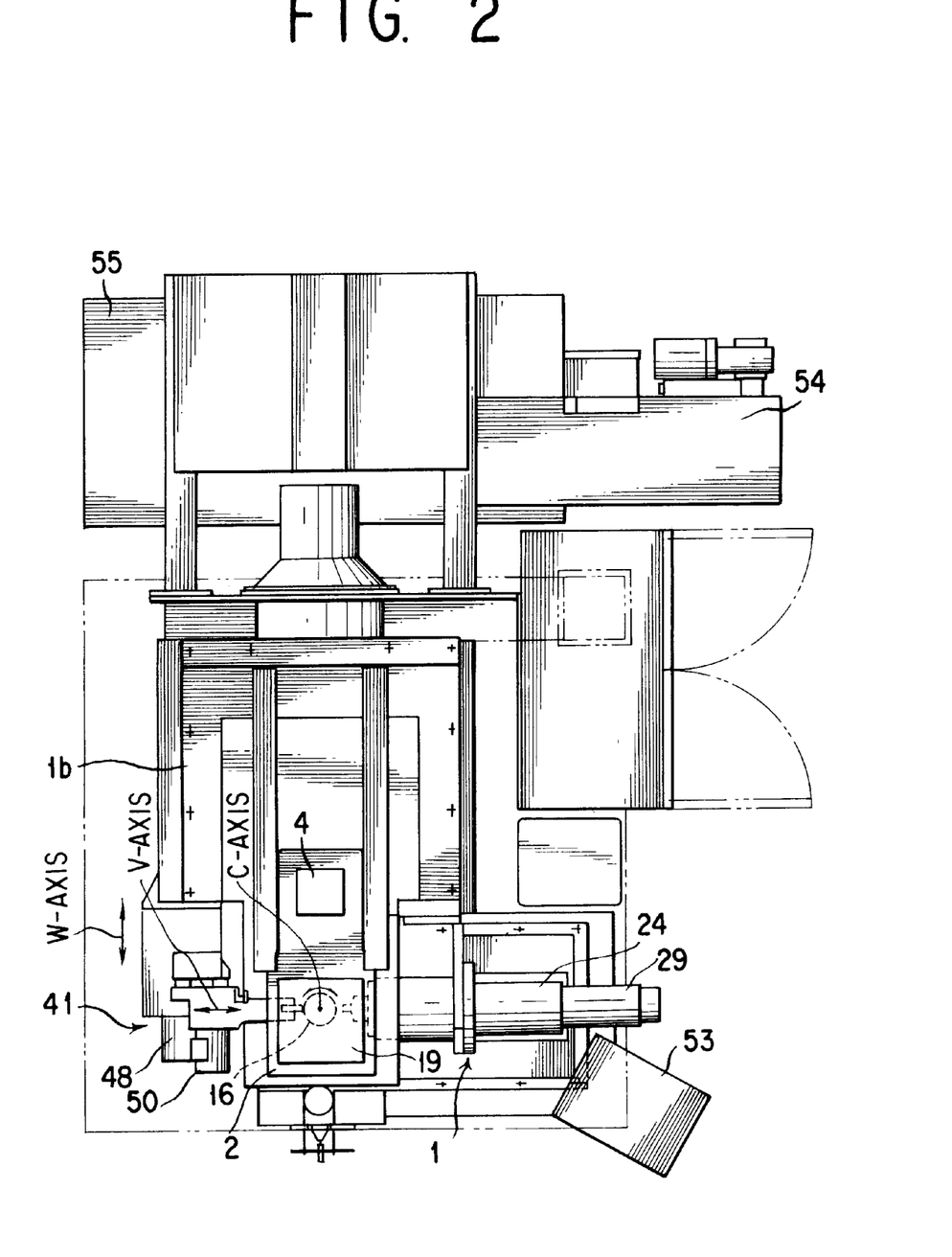
FIG. 2 is a top plan view of the combined machining apparatus.

FIGS. 1 and 2 depict in a front and a top plan view, respectively, a combined machining apparatus that is adapted to perform both the simultaneous machining over the inner and outer peripheral surfaces and the subsequent cut-split machining of a piston-ring blank or workpiece positioned at an identical place unaltered. As shown, both an inner and outer peripheral machining (milling machine) unit 1 and a cut-split machining (cutting machine) unit 41 are mounted on a common machine bed 1a.

The inner/outer peripheral machining unit 1 has, in front of a column 1b mounted on the bed 1a, a Z-axis slide 2 movable vertically or in the direction of a Z-axis by means of a Z-axis drive 3.

The Z-axis slide 2 is supported on a guide rail 1c that comprises a linear guide laid on a front face of the column 1b and extending in the direction of Z-axis so that it may be moved vertically by a Z-axis motor 4 constituted by a servo motor and mounted above the column 1b.

Figure 3:
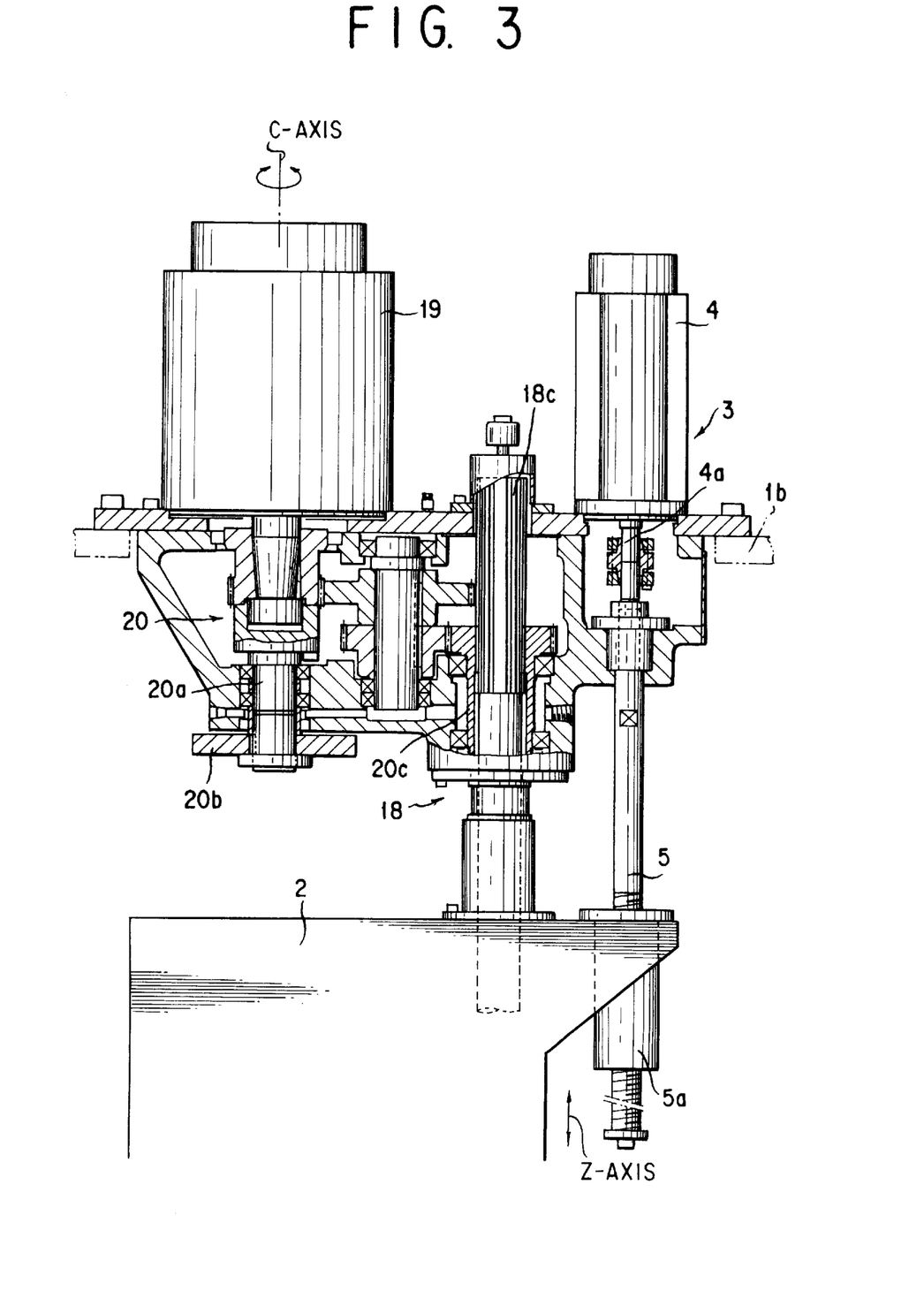
FIG. 3 is a sectional view that shows a C-axis drive and a Z-axis drive in the combined machining apparatus.

More specifically, the rotary axis 4a of the Z-axis motor 4 is, as shown in FIG. 3, connected to a threaded shaft 5 comprising a ball screw (lead screw) in mesh with a nut member 5a fastened to the Z-axis slide 2 so that a normal or reversed rotation of the threaded screw 5 by the Z-axis motor 4 may cause the Z-axis slide 2 to be vertically moved along the guide rail 1c. In this connection, it may be noted that the use of a counter weight slung up by a cord (neither is shown in any of the Figures) fastened to a top of the slide 2 allows the Z-axis motor 4 only of a small capacity to vertically move the Z-axis slide 2.

Vertically spaced apart from each other, an upper workpiece support 10 and a lower workpiece support 11 are also shown as mounted to the Z-axis slide 2.

Figure 4:
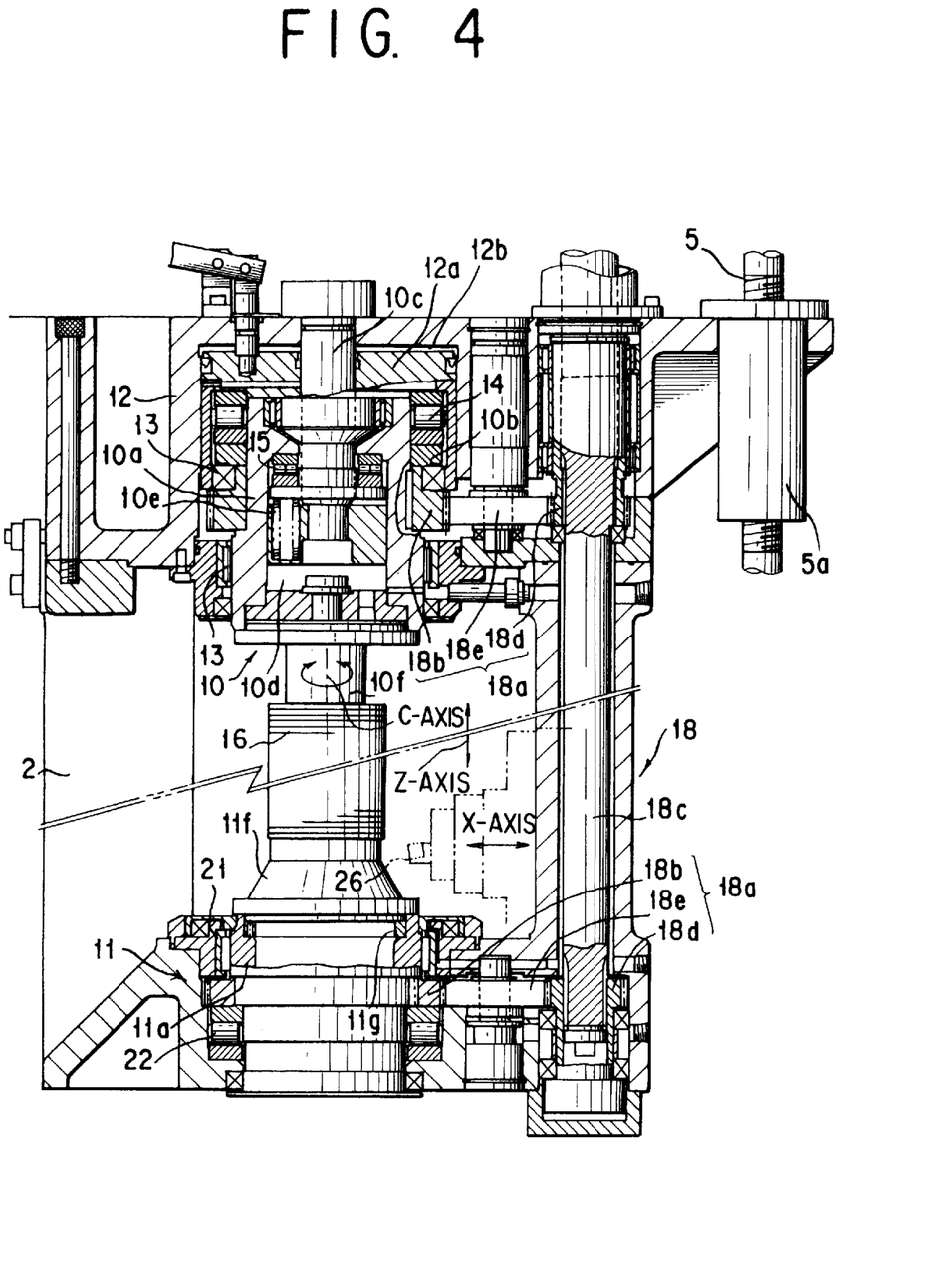
FIG. 4 is a sectional view that shows a workpiece support in the combined machining apparatus.

The upper workpiece support 10, as shown in FIG. 4, is mounted below a hydraulic cylinder assembly 12 arranged above the Z-axis slide 2 and has an upper spindle 10a disposed downwards of a piston 12a that is received at an upper part of the hydraulic cylinder assembly 12.

The upper spindle 10a, which is cylindrical, is supported to extend downwards via a plurality of bearings 13 by the underpart of the hydraulic cylinder assembly 12 so that it may be vertically moved along a C-axis that is a longitudinal axis of the upper spindle 10a parallel to the X-axis and may also be rotated about the C-axis. Further, a ring 10b is fitted around the upper spindle 10a and has its upper surface brought into contact via a thrust bearing 14 with the lower end side of the piston 12a so that supply of a pressure fluid into a pressure chamber 12b of the hydraulic cylinder assembly 12 may cause the upper spindle 10a to be pressed downwards via the piston 12a.

Centrally of the hydraulic cylinder assembly 12, a stationary shaft 10c is fastened to an upper surface of the hydraulic cylinder assembly 12.

The stationary shaft 10c towards its lower side passes through the piston 12a to reach a center region of the upper spindle 10a. The stationary shaft 10c also has a spring seat 10d attached to its lower end, on which a plurality of compression springs 10e are disposed tending to move the upper spindle 10a upwards.

Below the upper spindle 10a the upper workpiece support 10 includes an upper clamp head 10f for clamping a workpiece 16 between it and a lower clamp head 11f included in the lower workpiece support 11. Further, in an outer peripheral section of the upper spindle 10a, a driven gear 18b of a gear train 18a that constitutes a C-axis drive 18 is provided as being keyed in.

The C-axis drive 18, as shown in FIG. 3, includes a C-axis motor 19 that comprises a servo motor arranged upwards of the column 1b, the C-axis motor 19 being coupled to an input shaft 20a of a reducer 20.

The input shaft 20a of the reducer 20 has a fly-wheel 20b attached thereto that is designed to stabilize and make a rotation of the workpiece 16 to be evenly rotated when machined. The reducer 20 has an output shaft 20c that is splined to be mated with the upper end of a drive shaft 18c that is also splined of the C-axis drive 18 so that the drive shaft 18c may be normally or reversely rotated via the reducer 20 by the C-axis motor 19.

The drive shaft 18c of the C-axis drive 18 is supported rotatably as vertically oriented to be parallel to a longitudinal axis of the workpiece 16. The drive shaft 18c has its mid and lower end sections which are splined to be mated with a drive gear 18*d* of the gear train 18*a* in the upper workpiece support 10 and with that in the lower workpiece support 11, respectively.

These drive gears 18*d* and 18*d* are in mesh with the follower gears 10*b* and 10*b* formed on the outer periphery of the upper spindle 10*a* and on the outer periphery of the lower spindle 11*a*, respectively, so that the upper and lower spindles 10*a* and 11*a* may be synchronously rotated in an identical direction by the C-axis motor 19 via the drive shaft 18*c* and gear trains 18*a* and 18*a*.

The lower spindle 11a as is the upper spindle 10*a* is shaped to be cylindrical and is rotatably supported by the Z-axis slide 2, here via the bearing 21. Also, a thrust bearing 22 is interposed between the Z-axis slide 2 and the follower gear 18*b* which is keyed on the outer periphery of the lower spindle 11*a*.

The clamp head 11*f* which serves, as mentioned above, to clamp the workpiece 16 between it and the upper clamp head 10*f* attached to the upper spindle 10*a* in the upper workpiece support 10 is arranged above the lower spindle 11*a* in the lower workpiece support 11.

At this point it should be noted that when the upper and lower spindles 10*a* and 11*a* are synchronously rotated by the C-axis motor 19, a backlash in the spline of the drive shaft 18*c* or the gear train 18*a* may cause an unevenness in the rotations of the upper and lower spindles 10*a* and 11*a* and hence a deviation in phase angle between the two spindles.

In order to prevent such a deviation, when a workpiece 16 is machined a suitable locking means such as a lock-tight (not shown) can be provided to allow a plate 11*g* fitted between the lower spindle 11*a* and the lower clamp head 11*f* to be secured to the lower spindle 11*a* with a backlash eliminated in the upper and lower gear trains.

An outer peripheral surface machining section 24 is mounted at an intermediate portion of the column 1*b* for machining (e.g. milling) an outer peripheral surface of the workpiece 16. An inner peripheral surface machining section 25 is mounted on the bed 1*a* for machining or milling an inner peripheral surface of the workpiece 16 while the outer peripheral surface is being machined by the unit 24.

Figure 5:
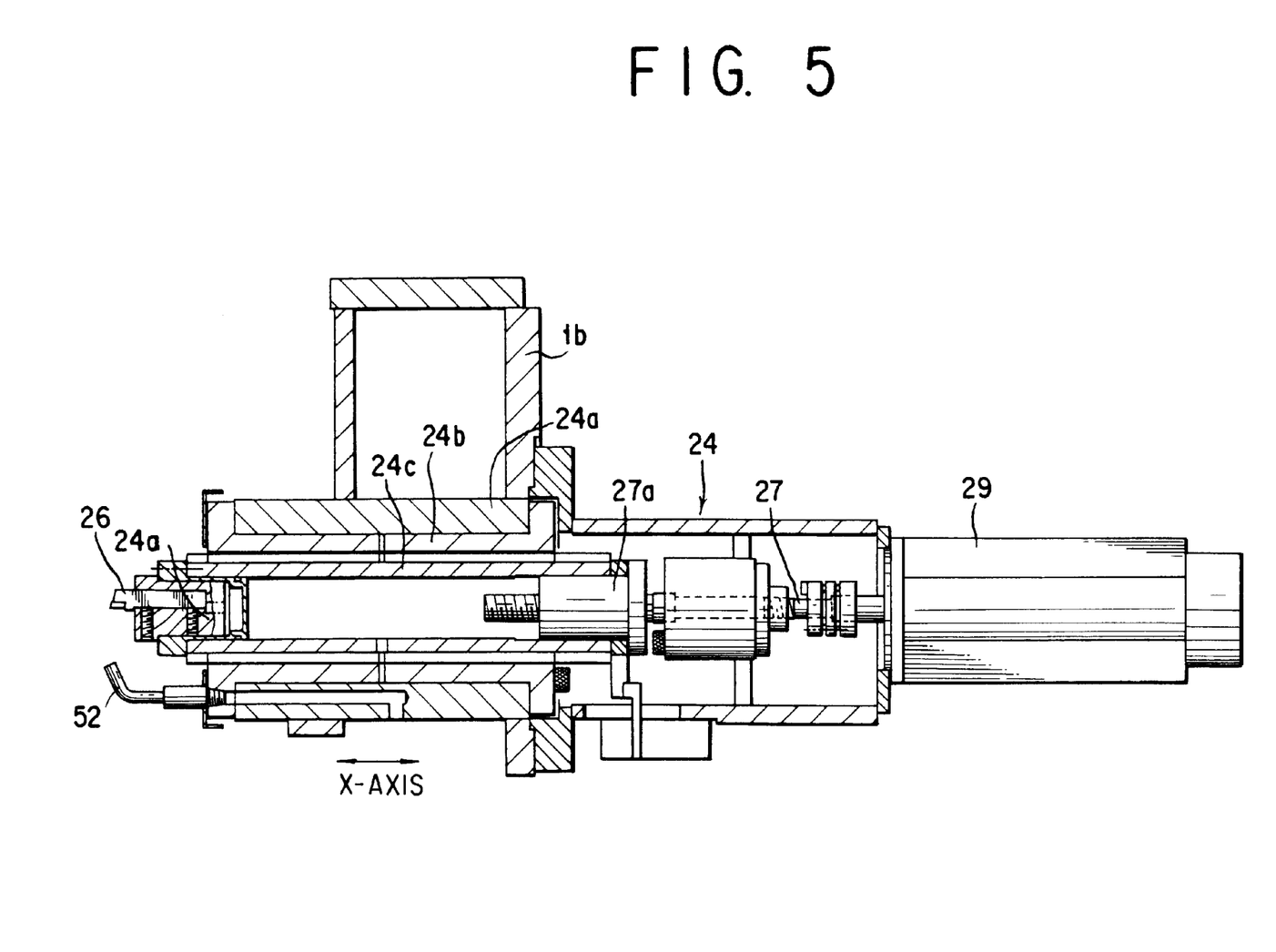
FIG. 5 is a sectional view that shows an outer peripheral surface machining section of an inner and outer peripheral surface machining unit in the combined machining apparatus.

In the outer peripheral surface machining section 24, as shown in FIG. 5 a tool support member 24*c* is disposed in an guide member 24*a* horizontally fastened to the column 1*b* and is supported as movable in the direction of an X-axis (that is orthogonal to the C-axis) via a ball spline 24*b*.

The tool support member 24*c* has a cutting tool 26 detachably held to an end thereof on the side of the workpiece 16 via a tool mounting member 24*d*. The support member 24*c* also has a nut member 27*a* fastened to an opposite end thereof, the nut member 27*a* being in mesh with one end of a threaded shaft 27 comprising a ball screw (lead screw).

The threaded shaft 27 has the other end coupled to an X-axis motor 29 comprising a servo motor which is mounted via a bracket 28 to the column 1*b*, so that a normal or reversed rotation of the threaded shaft 27 by the X-axis motor 29 may displace the cutting tool 26 towards and away from the workpiece 16.

Figure 6:
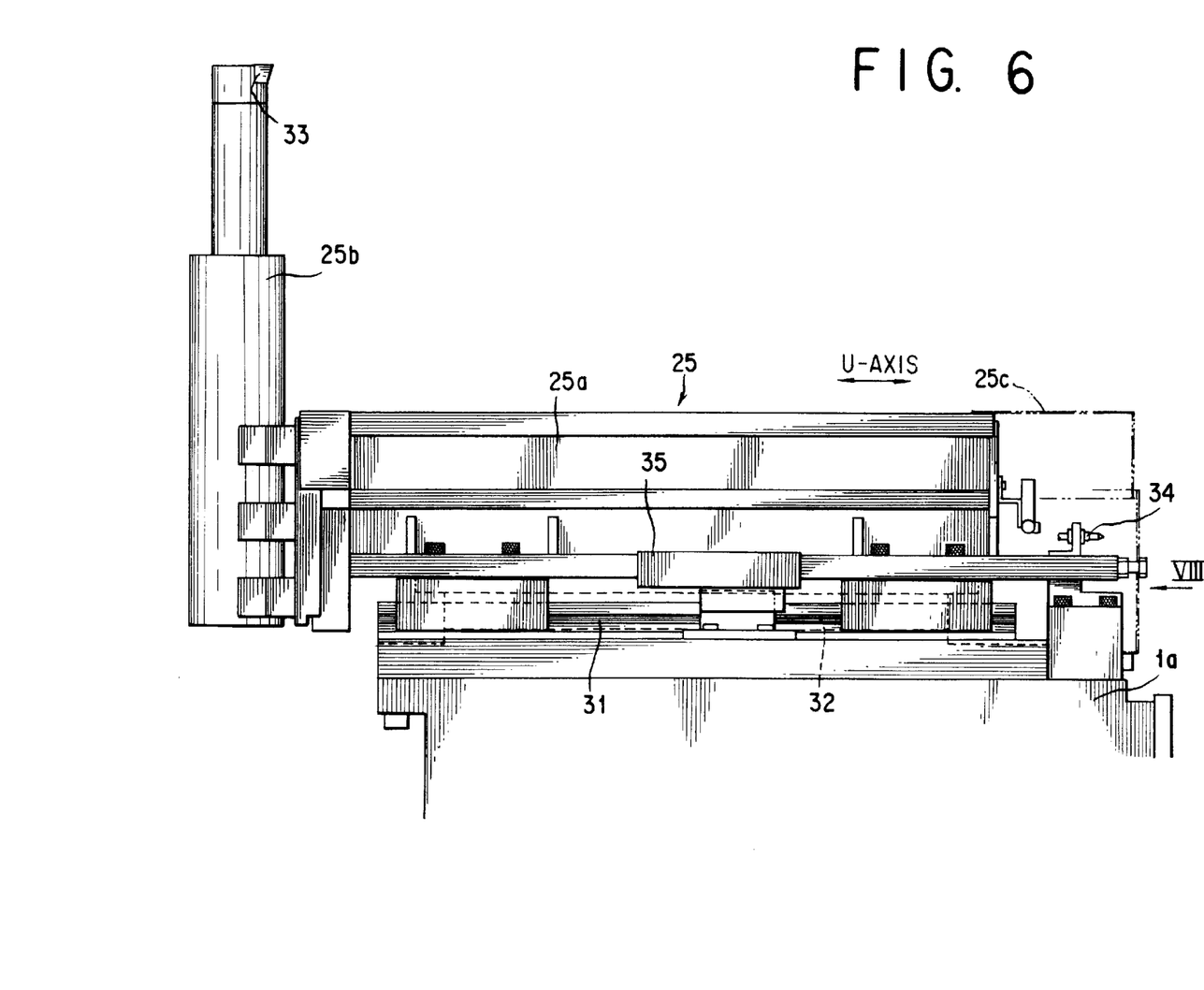
FIG. 6 is a side elevational view that shows an inner peripheral surface machining section of an inner and outer peripheral surface machining unit in the combined machining apparatus.
Figure 7:
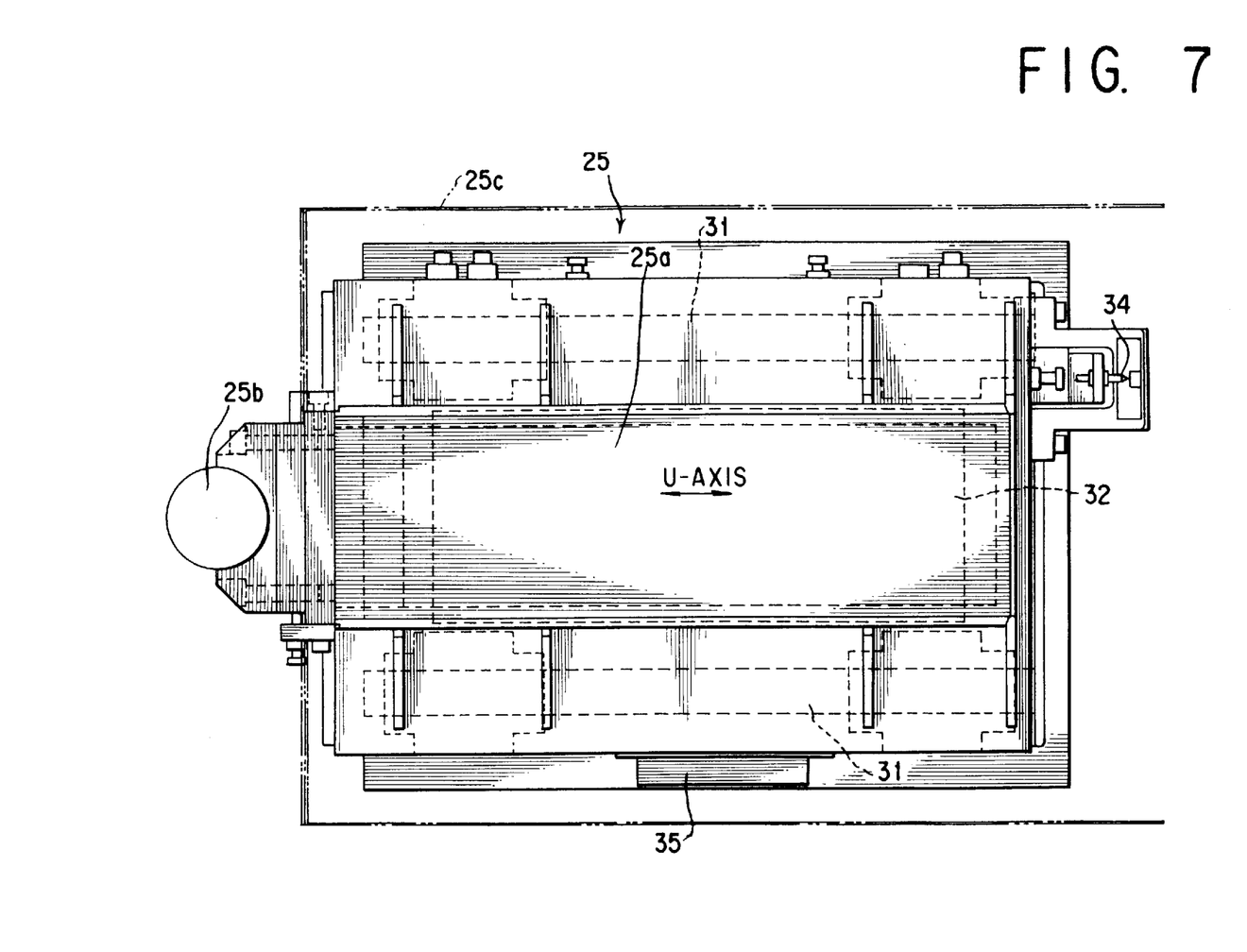
FIG. 7 is a top plan view that shows an inner peripheral surface machining section of an inner and outer peripheral surface machining unit in the combined machining apparatus.
Figure 8:
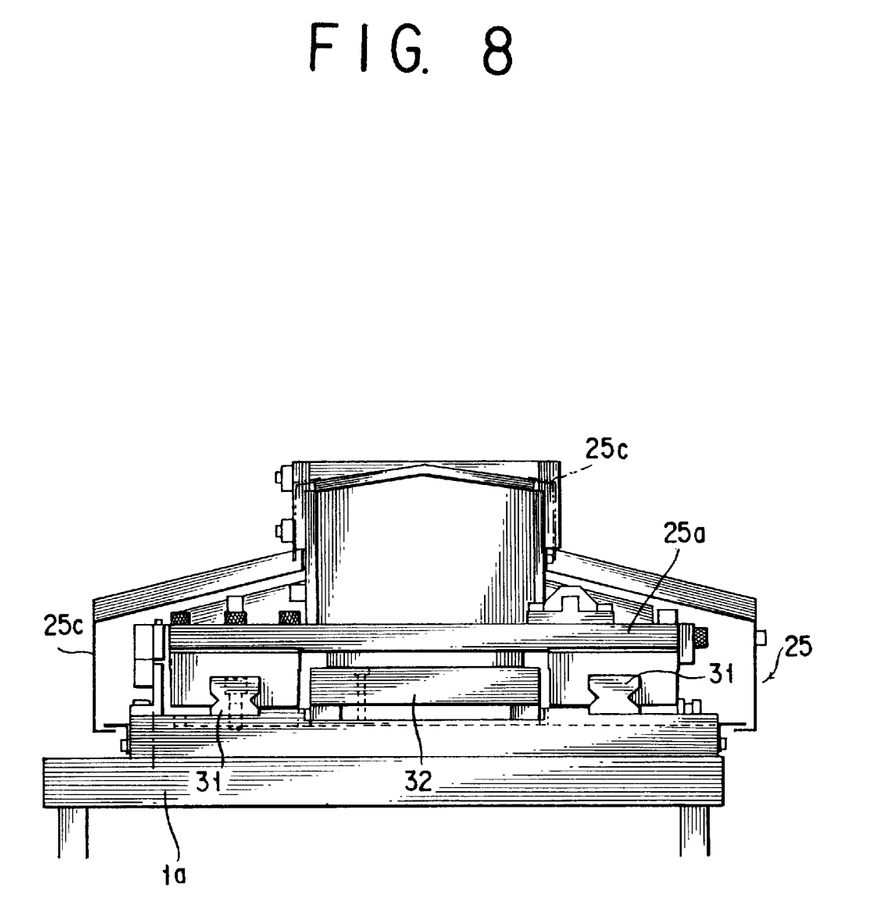
FIG. 8 is a side view taken along the line VII and seen from the direction of arrow indicated.

On the other hand, the inner peripheral machining section 25 for machining or milling an inner peripheral surface of the workpiece 16 has, as shown in FIGS. 6 through 8, a U-axis slide 25*a* supported on a guide rail 31 which comprises a roller-type linear guide laid on the bed 1*a* in the direction of a U-axis parallel to the X-axis.

A space above the U-axis slide 25*a* is enclosed with a roof cover 25*c* designed to facilitate exhaust of a cutting dust. A U-axis motor 32 comprising a linear servo motor is mounted between a lower part of the U-axis slide 25*a* and an upper surface of the bed 1*a* for driving the U-axis slide 25*a* in the directions of the U-axis.

The end side of the U-axis slide 25*a* reaches below the lower spindle 11*a* and has the lower end of a boring bar 25*b* fastened thereto which extends to lie substantially vertical thereto.

The upper end side of the boring bar 25*b* reaches insides of the workpiece 16 past the interior of the lower spindle 11*a* and has a cutting tool 33 detachably mounted thereto for cutting the inner surface of the workpiece 16.

Also shown in FIGS. 6 and 7 as provided are a U-axis origin detecting device 34 for the detection of the position of an origin of the U-axis slide 25*a* and a slide position detecting device 35 comprising, e.g., a linear scale for the detection of the position of the U-axis slide 25*a*, the detection devices 34 and 35 providing signals which are furnished to an NC unit 53 (see FIGS. 1 and 2) for numerically controlling the Z-axis motor 4, the C-axis motor 19, the X-axis motor 29 and the U-axis motor 32.

Figure 9:
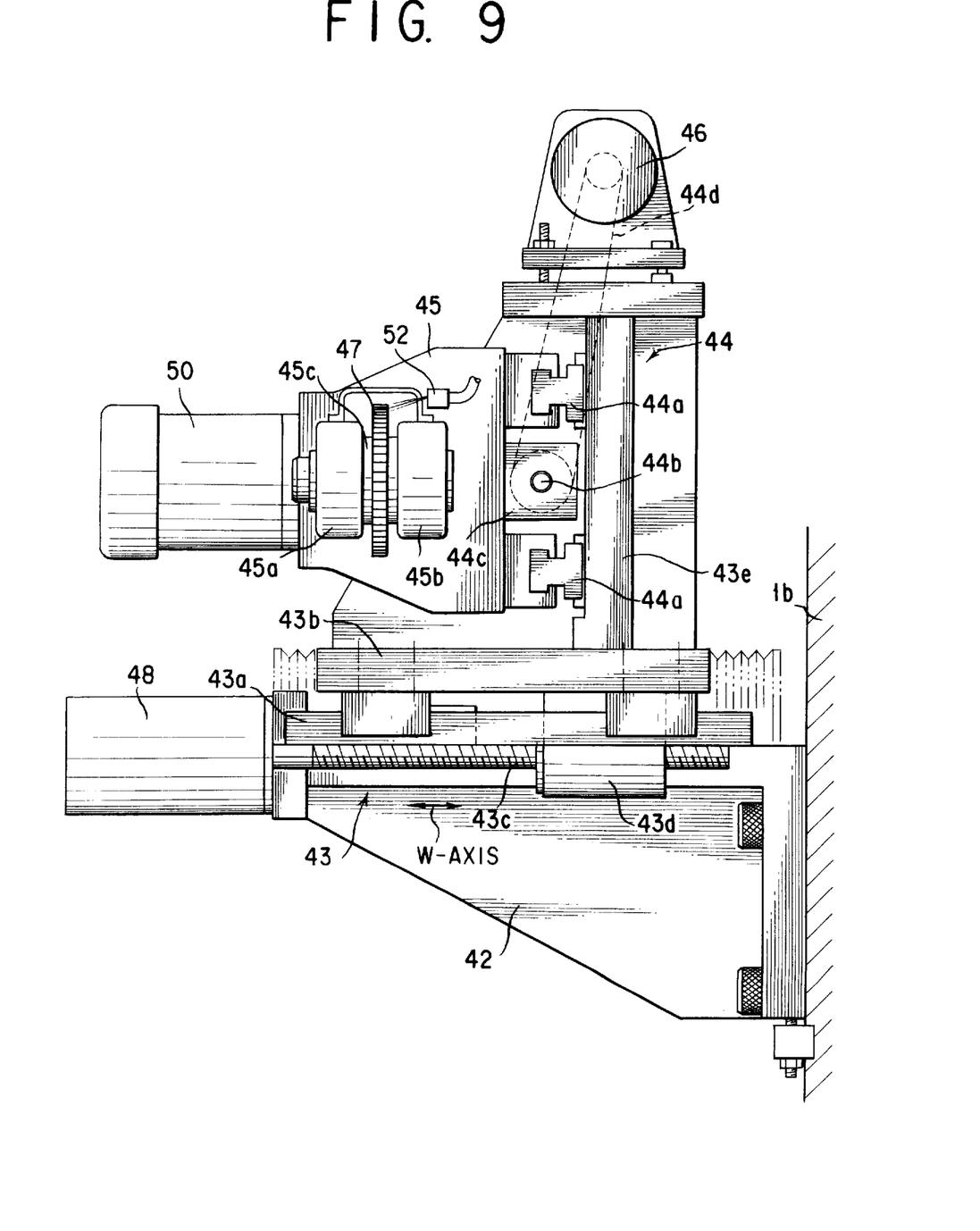
FIG. 9 is a side elevational view that shows a cut to divide machining unit in the combined machining apparatus.
Figure 10:
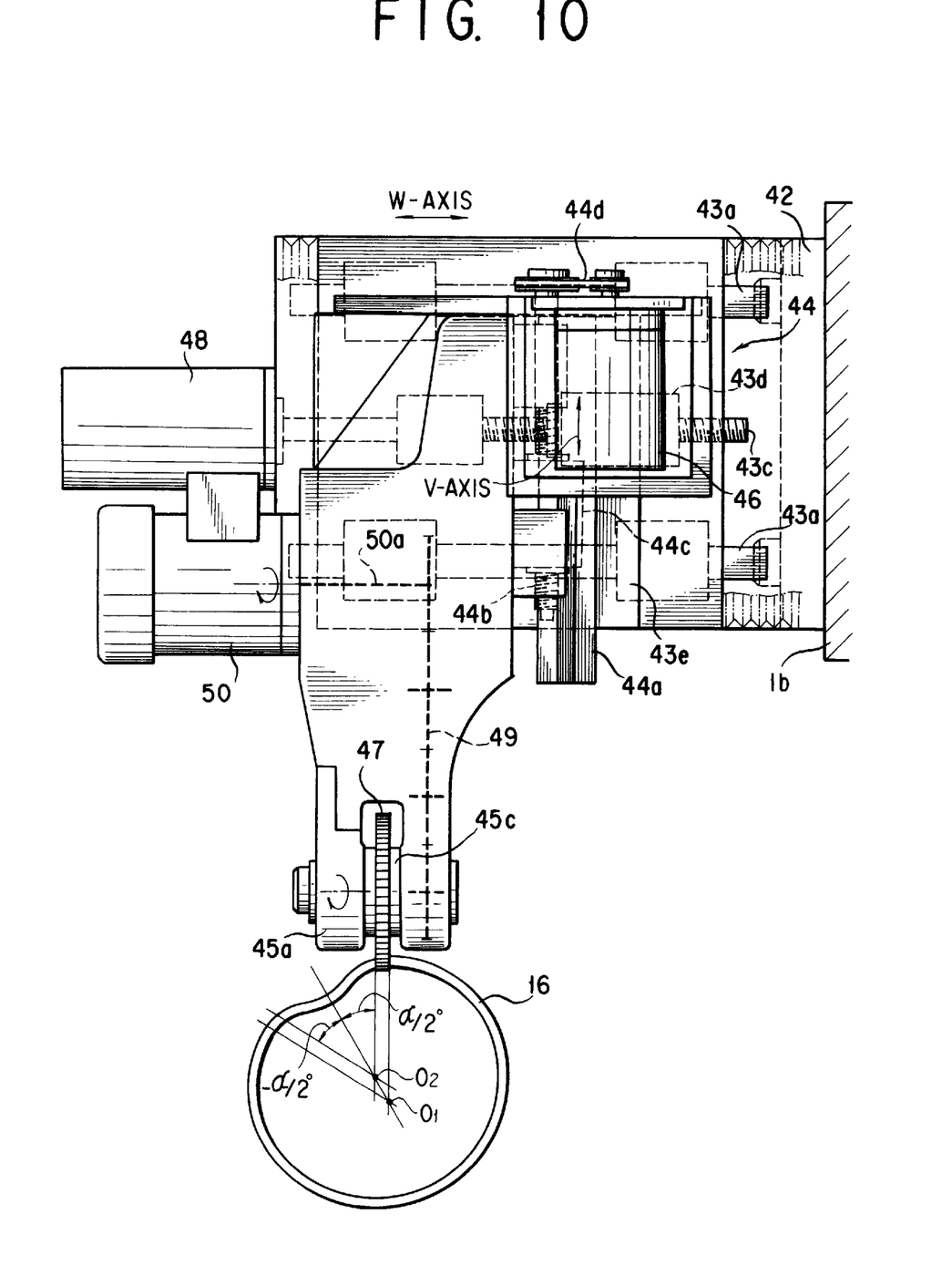
FIG. 10 is a top plan view of the cut-split machining unit in the combined machining apparatus.
Figure 11:
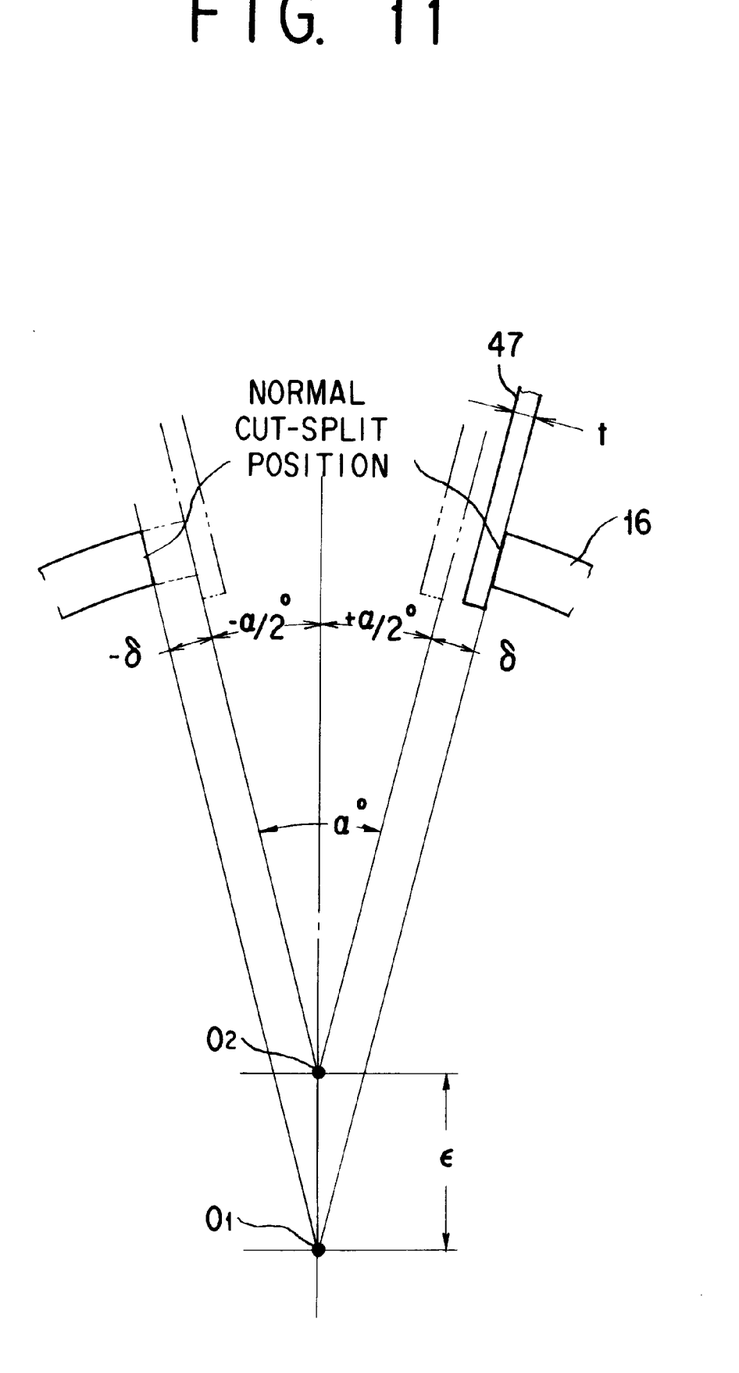
FIG. 11 is a diagrammatic view illustrating the case in which a workpiece is cut-split with a center of cut-split located at a center of the C-axis and the case in which a workpiece is cut-split with the center of cut-split deviated from the center of the C-axis, using the cut-split machining unit shown in FIG. 10.

Having described the construction of the inner and outer peripheral surface machining unit 1, reference is now made to FIGS. 9 and 10 for the explanation of the construction of the cut-split machining unit 41.

The cut-split machining unit 41 is designed to act on the workpiece 16 machined over its inner and outer peripheral surfaces by the inner and outer peripheral surface machining unit 1, in a manner such as to machine, by cut-splitting, the so machined workpiece 16 left unaltered in position or at a position identical to that at which the workpiece has been machined over its inner and outer peripheral surfaces by the peripheral machining unit 1. To this end, the cut-split machining unit 41 use, among other drive axes, the same Z-axis and C-axis as the peripheral surface machining unit 1. Further, the cut-split machining unit 41 uses the same upper and lower workpiece supports 10 and 11 as in the peripheral machining unit 1 to allow a workpiece 16 having been machined over its inner and outer peripheral surfaces to be cut-split and while it remains clamped as before.

Thus, in front of the column 1*b* of the inner and outer peripheral surface machining unit 1, as shown in FIG. 9 a support member 42 is fastened thereto that extends horizontally, on which a W-axis drive 43 is mounted.

The W-axis drive 43 has a W-axis slide 43*b* slidably supported on a pair of guide rails 43*a*, each comprising a linear guide, which are laid on the support member 42 to extend in the back and forth direction, i.e. in the direction of a W-axis.

Disposed between the guide rails 43*a* and 43*a* and extending parallel thereto is a threaded shaft 43*c*, that comprises a ball screw or lead screw, which is in mesh with a nut member 43*d* secured to a lower surface of the W-axis slide 43*b*. One end of the threaded shaft 43*c* is coupled to a W-axis motor 48 comprising a servo motor, that is attached to the front end of the support member 42. Rotating the threaded shaft 43*c* normally and reversely by the W-axis motor 48 allows the W-axis slide 43*b* to move forth and back in the direction of W-axis.

A spindle head 45 is disposed above the W-axis slide 43*b* as movable by a V-axis drive 44 in the direction of a V-axis that is orthogonal to the W-axis.

The V-axis drive 44 has a pair of guide rails 44*a*, each comprising a linear guide, which are vertically spaced apart from each other and extend parallel to each other in the direction of the V-axis on a side surface of a support plate 43e which is vertically mounted on the W-axis slide 43b. The spindle head 45 is supported on the guide rails 44a as movable in the V-axis direction.

Disposed between the guide rails 44a and 44a and extending parallel thereto is a threaded shaft 44b, that comprises a ball screw or lead screw, which is in mesh with a nut member 44c fastened to the spindle head 45. One end of the threaded shaft 44b is coupled via an endless belt 44d to a V-axis motor 46 comprising a servo motor, that is mounted on an upper part of the W-axis slide 43b. A rotation of the threaded shaft 44b by the V-axis motor 46 in a normal or reverse direction causes a movement of the spindle head 45 in a direction of the V-axis.

The forward end side of the spindle head 45 is allowed to project in the direction of a workpiece 16 supported by the upper and lower workpiece supports 10 and 11 between them, and is there bifurcated into a pair of branches 45a and 45b. Here, One of these branches, 45a is removable from the other, 45b to facilitate detachment of a cutting tool 47, and a spindle 45c axially extending parallel to the W-axis is rotatably supported across the centers of the branches 45a and 45b.

The spindle 45c has in its middle the cutting tool 47 mounted thereon which may comprise a metal saw in the form of a disk. One end of the spindle 45c as shown in FIG. 10 is coupled via a power transmission 49 such as a gear train to the rotary shaft 50a of a spindle motor 50 that may comprise an inverter controlled general purpose motor which is attached to the spindle head 45 at its base end side to cause the cutting tool 47 to be rotated by the spindle motor 50 via the spindle 46c.

Shown at 52 in FIGS. 5 and 9 is a coolant nozzle for flushing a cutting fluid or coolant onto the cutting tool 26 while in the process of machining.

Also, shown in FIG. 2 are a chip conveyer 54 and a coolant reservoir 55.

Now, an explanation will now be given of an operation of machining a workpiece 16 which is here constituted by a stacked piston ring aggregate by using the combined machining apparatus constructed as have been described.

A workpiece 16, that comprises a stacked blank piston ring aggregate, is shown in FIG. 10 as having its inner and outer peripheral surfaces curved in non-circular configurations which are not identical to each other. The need therefore arises that the outer peripheral surface machining section 24 and the inner peripheral surface machining section 25 be separately operated by a NC (numerical control) unit 53 under separate NC instructions.

Also, a simultaneous machining of the inner and outer peripheral surface of a workpiece 16 which is rotated by the C-axis motor 19 requires the X-axis motor 29, the U-axis motor 32 and the Z-axis motor 4 to be controlled in synchronism with the C-axis motor 19 being rotated. This requirement is found as the use of an ordinary machining cycle operation is a time-consuming Job in processing data of movement and makes it difficult to perform the machining efficiently.

The combined machining apparatus according to the present invention is accordingly implemented under numerical control (NC) and embodied, e.g., in an NC featured rapid cycle machining operation or a DNC (direct numerical control) machining operation.

When a machining operation is carried out in an NC featured rapid machining system, data converted into an amount of movement per unit time of basic processing and a number of repetitions of the cycle are registered into a data area and a header in an NC unit to allow a rapid cycle machining operation to be performed under a main program of machining.

In preparing a machining operation with the combined machining apparatus described, a plurality of blank piston rings are stacked together in a phase to phase relationship to form, as aggregated, a cylindrical workpiece 16. The workpiece 16, clamped in its longitudinal direction by means of a hand carrier jig (not shown) and as it is, is conveyed into the inner and the outer peripheral surface machining unit 1 and set in position between the upper and lower clamp heads 10f and 11f of the upper and lower spindles 10a and 11a.

In this state, a pressure fluid is introduced into the fluid pressure chamber 12b of the hydraulic cylinder assembly 12 to lower the piston 12a and the upper spindle 10a so that the workpiece 16 may be clamped between the clamp head 10f of the upper spindle 10 and the clamp head 11f of the lower spindle 11a to make a longitudinal axis of the workpiece 16 in alignment with those of the upper and lower spindles 10a and 11a.

Then, after having been phase-indexed, the workpiece 16 is brought into rotation by synchronously rotating the upper and lower spindles 10a and 11a with the C-axis motor 19 in the C-axis drive 18. The workpiece 16 is machined over its outer peripheral surface, e.g., from its lower end side, with the cutting tool 26 provided in the outer peripheral surface machining unit 24 and at the same time over its inner peripheral surface, then from its lower end side, with the cutting tool 33 provided in the inner peripheral surface machining unit 25.

The inner and outer peripheral surfaces of the workpiece 16 which are freely and not identically curved, are simultaneously machined with the X-axis motor 29 and the U-axis motor 32 separately NCed in synchronism with the C-axis motor 19 for rotation. As the machining proceeds, the Z-axis slide 2 is lowered with the Z-axis motor 4 to allow these inner and outer peripheral surfaces to be machined over a full length of the workpiece 16. A machining dust that is produced from the inner peripheral surface being machined of the workpiece 16 is allowed to pass through the lower spindle 11a and to fall down without stagnation in the workpiece 16. Thus, not only would there be no possible damage to a workpiece surface or to the cutting tool 33 for the reason of a machining dust entrapped between the workpiece 16 and the cutting tool 33, but there should be virtually no premature wear or life shortening of the cutting tool, and no deteriorated machining accuracy, as caused by such dust entrapment.

After the inner and outer peripheral surfaces of the workpiece have been machined, the tool support member 24 and the U-axis slide 25a are caused to recede to their original positions with the X-axis motor 29 and the U-axis motor 32, respectively, and the Z-axis slide 2 is returned up to its original position with the Z-axis motor 4. Thereafter, a cut-split machining operation for the workpiece 16 machined over its inner and outer peripheral surfaces is initiated, with the workpiece 16 left clamped and held positioned at its original place or in situ, by actuating the cut-split machining unit 41.

Figure 12A:
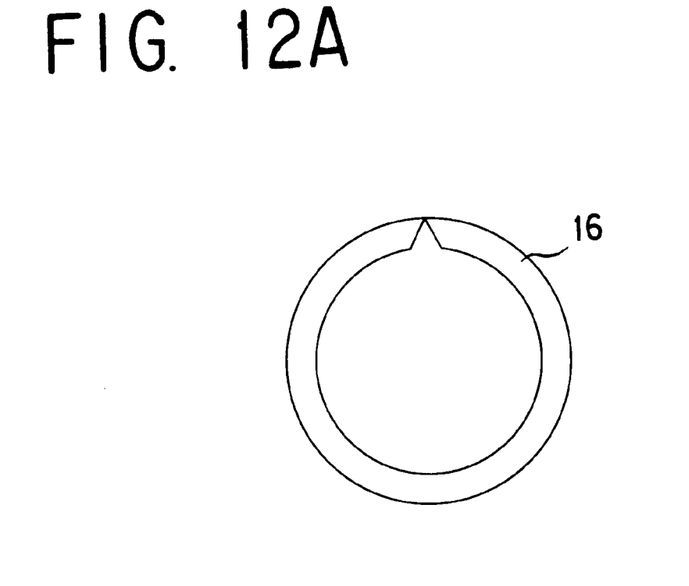
FIGS. 12A and 12B are diagrammatic view that show a workpiece cut-split with the center of cut-split located at the center of the C-axis and a workpiece cut-split with the center of cut-split deviated from the center of the C-axis, using the cut-split machining unit shown in FIG. 10
Figure 12B:
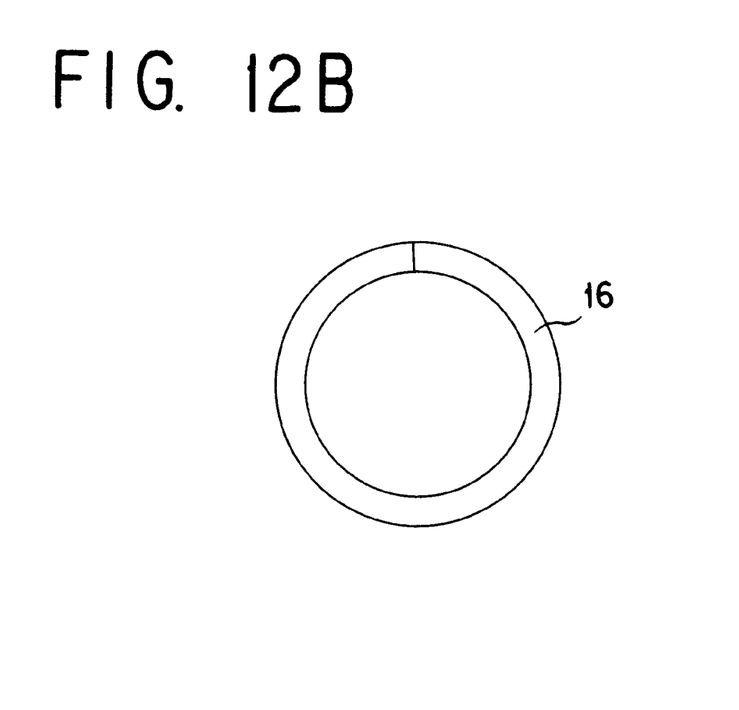

In initiating a cut-split machining operation for the workpiece 16, a cut-split position of the workpiece 16 is indexed or determined by rotating the workpiece 16 with the C-axis motor 19. Then, if the workpiece 16 is cut-split with the center of cut-split 01 located at the center of rotation of the workpiece 16 (C-axis center 02), a dimensional error of machining that is equal to the thickness t of the cutter will develop. This will have the consequence that reducing the diameter of the workpiece 16 cut-split to bring the cut surfaces into a butt contact produces an opening between the butt-contact surfaces as shown in FIG. 12A and does not allow a piston ring as desired as shown in FIG. 12B to be obtained.

Preventing such inconvenience requires that the center of cut-split 01 be shifted by a certain distance ε relative to the C-axis center 02 for performing a cut-split machining operation.

Accordingly, in this form of practice of the present invention, a cut-split machining operation is carried out upon shifting the center of cut-split 01 by ε away from the C-axis center 02 and to this end upon positioning the cutter 47 as displaced by a corresponding distance ±δ in the direction of W-axis. Cut surfaces of the workpiece 16 that can then be obtained will result in an intimate butt contact without an opening and hence a formed piston ring that is satisfactory as shown FIG. 12B.

In such a method of correction, more specifically, after a workpiece 16 has been machined over its inner and outer peripheral surfaces, an initial cut-split position (+α/2° +δ) is indexed or determined. For this indexing or determination, the NC unit 53 instructs the C-axis motor 19 to rotate the workpiece 16 about the C-axis center 02 by an angle of rotation +α/2° and the W-axis motor 48 to rotate the threaded shaft 43c to move the W-axis slide 43b by a distance +δ°, thus setting the cutter 47 at that initial cut-split position.

Instructions or commands are then furnished to direct: the spindle motor 50 to rotate the cutter 47 and meanwhile the V-axis motor 46 to rotate the threaded shaft 44b to advance the spindle head 45 to a position as shown in FIG. 10; then in that state the Z-axis motor 4 to lower the Z-axis slide 2 in the direction of Z-axis, thus initiating a cut-split machining operation as required, in sequence from the lower end side towards the upper end side, of the workpiece 16.

Then, when the cutter 47 arrives at a region of the upper end side of the workpiece 16 and the cut-split machining operation at the initial cut-split position is thereby finished, the V-axis motor 46 is directed to reverse the rotation of the threaded shaft 44b to move the spindle head 45 back to its original position, and the Z-axis motor 4 is directed to raise the Z-axis slide 2 to its original position.

Then, in this state a next cut-split position (−α/2° +δ) is indexed or determined. To this end, the NC unit 53 here instructs the C-axis motor 19 to rotate the workpiece 16 about the C-axis center 02 by an angle of rotation −α/2° and the W-axis motor 48 to rotate the threaded shaft 43c to move the W-axis slide 43b by a distance −δ°, thus setting the cutter 47 at the second or subsequent cut-split position.

Instructions or commands are then given, here again, to direct: the spindle motor 50 to rotate the cutter 47 and meanwhile the V-axis motor 46 to rotate the threaded shaft 44b to advance the spindle head 45 to a position as shown in FIG. 10; then in that state the Z-axis motor 4 to lower the Z-axis slide 2 in the direction of Z-axis, thus initiating a cut-split machining operation as required, in sequence from the lower end side towards the upper end side, of the workpiece 16.

Then, when the cutter 47 arrives at a region of the upper end side of the workpiece 16 and the cut-split machining operation at the second cut-split position is thereby finished, the V-axis motor 46 is directed to reverse the rotation of the threaded shaft 44b to move the spindle head 45 back to its original position, and the Z-axis motor 4 is directed to raise the Z-axis slide 2 to its original position.

It thus becomes possible to carry out a simultaneous machining of the inner and outer peripheral surfaces of a workpiece 16 and a subsequent cut-split machining of the workpiece at an identical position, with the workpiece so positioned or held positioned in situ. This assures that a workpiece 16 is identically centered precisely in both the two distinct machining operations, permitting a piston ring or the like product prepared at an enhanced accuracy to result. Furthermore, the need to transfer a workpiece from an initial peripheral machining stage to a subsequent cut-split machining stage is thereby eliminated with the consequence that the entire expenditure of time and means for material transfer is significantly saved and reduced.

It should further be noted that a workpiece transfer means is advantageously arranged in front of the peripheral surface machining unit 1 and the cut-split machining unit 41. Such provision is particularly beneficial to permit all the needed operations of workpiece transfer required in the combined machining apparatus herein disclosed to be carried out fully automatically.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not intended to be limited to the specific embodiments thereof set out above, but to include all possible embodiments thereof that can be made within the scope with respect to the features specifically set forth in the appended claims and encompasses all the equivalents thereof.

What is claimed is:

1. A combined machining apparatus adapted for use in making a piston ring from a workpiece, said combined machining apparatus comprising:

a workpiece support for clamping the workpiece in a predetermined position on a bed;

said workpiece support comprising an upper clamp head and a lower clamp head for vertically clamping the workpiece to be rotatable about a longitudinal axis thereof oriented substantially vertically;

a peripheral machining unit mounted on the bed, said peripheral machining unit being numerically controlled and including an outer peripheral surface machining section and an inner peripheral surface machining section which are operable together to simultaneously machine an outer peripheral surface and an inner peripheral surface of the workpiece clamped in the predetermined position;

a cut-split machining unit mounted on the bed and adapted to act on the machined workpiece so as to further machine, by cut-splitting, the machined workpiece while the machined workpiece remains in the predetermined position, without being unclamped from the workpiece support;

a C-axis drive adapted to be numerically controlled for rotating said workpiece about a C-axis corresponding to said longitudinal axis of the workpiece; and a Z-axis drive adapted to be numerically controlled for moving said workpiece in a direction of said longitudinal axis;

said outer peripheral surface machining section of said peripheral machining unit being arranged to be movable in a direction of an X-axis extending orthogonal to the longitudinal axis of said workpiece, and to be operable with a first cutting tool adapted to be numerically controlled to operate in synchronism with said C-axis drive for machining the outer peripheral surface of said workpiece; and said inner peripheral surface machining section of said peripheral machining unit being arranged to be movable in a direction of a U-axis extending parallel to said X-axis, and to be operable with a second cutting tool adapted to be inserted from an end side of said workpiece and to be numerically controlled to operate in synchronism with said C-axis drive for machining the inner peripheral surface of said workpiece.

2. A combined machining apparatus according to claim 1, wherein said C-axis drive is adapted to determine a cut-split position of the workpiece, and wherein said combined machining apparatus further comprises:

a V-axis drive means operable with a cutter for cut-splitting said workpiece, having a V-axis motor and adapted to be numerically controlled for moving said cutter in engagement with and away from said workpiece in a direction of V-axis; and a W-axis drive means having a W-axis slide for supporting said V-axis drive means, including a W-axis motor and adapted to be numerically controlled for moving said workpiece in a direction of W-axis extending orthogonal to the longitudinal axis of said workpiece, thereby correcting a deviation of said cutter from the cut-split position for said workpiece arising from a deviation in a center of cut-split relative to a center of said C-axis.

3. A combined machining apparatus according to claim 1, wherein said cut-split machining unit comprises a single rotary cutter adapted to cut-split the machined workpiece while the machined workpiece remains in the predetermined position.

4. A combined machining apparatus adapted for use in making a piston ring from a workpiece, said combined machining apparatus comprising:

a workpiece support for clamping the workpiece in a predetermined position on a bed;

said workpiece support comprises an upper clamp head and a lower clamp head for vertically clamping the workpiece to be rotatable about a longitudinal axis thereof oriented substantially vertically;

a peripheral machining unit mounted on the bed, said peripheral machining unit being numerically controlled and including an outer peripheral surface machining section and an inner peripheral surface machining section which are operable together to simultaneously machine an outer peripheral surface and an inner peripheral surface of the workpiece clamped in the predetermined position;

a cut-split machining unit mounted on the bed and adapted to act on the machined workpiece so as to further machine. by cut-splitting, the machined workpiece while the machined workpiece remains in the predetermined position, without being unclamped from the workpiece support;

a C-axis drive adapted to be numerically controlled for rotating said workpiece about a C-axis corresponding to said longitudinal axis of the workpiece, and to thereby determine a cut-split position of the workpiece;

a Z-axis drive adapted to be numerically controlled for moving said workpiece in a direction of said longitudinal axis;

a V-axis drive operable with a cutter for cut-splitting said workpiece, said V-axis drive including a V-axis motor and being adapted to be numerically controlled for moving said cutter in engagement with and away from said workpiece in a direction of a V-axis; and a W-axis drive having a W-axis slide for supporting said V-axis drive, said W-axis drive including a W-axis motor and being adapted to be numerically controlled for moving said workpiece in a direction of a W-axis extending orthogonal to the longitudinal axis of said workpiece, to thereby correct a deviation of said cutter from the cut-split position of the workpiece arising from a deviation of a cut-split center relative to a center of the C-axis.

5. A combined machining apparatus according to claim 4, wherein said cut-split machining unit comprises a single rotary cutter adapted to cut-split the machined workpiece while the machined workpiece remains in the predetermined position.

* * * * *